US 6,635,132 B2

(12) United States Patent
Caretta et al.

(10) Patent No.: US 6,635,132 B2
(45) Date of Patent: Oct. 21, 2003

(54) METHOD AND AN APPARATUS FOR MANUFACTURING COMPONENTS OF A TIRE FOR VEHICLE WHEELS

(75) Inventors: Renato Caretta, Gallarate (IT); Osvaldo Scarzello, Turin (IT); Maurizio Marchini, Seregno (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 09/881,021

(22) Filed: Jun. 15, 2001

(65) Prior Publication Data

US 2001/0042586 A1 Nov. 22, 2001

Related U.S. Application Data

(63) Continuation of application No. PCT/IT99/00377, filed on Nov. 19, 1999.
(60) Provisional application No. 60/118,529, filed on Feb. 2, 1999.

(30) Foreign Application Priority Data

Dec. 17, 1998 (EP) ............................................. 98830762

(51) Int. Cl.$^7$ ............................................. B29D 30/10
(52) U.S. Cl. ...................... 156/111; 156/117; 156/133; 156/396; 156/397
(58) Field of Search ............................. 156/111, 110.1, 156/117, 123, 130, 133, 396, 397, 405.1

(56) References Cited

U.S. PATENT DOCUMENTS 4,474,399 A   10/1984  Lauber
4,963,207 A   10/1990  Laurent
5,171,394 A   12/1992  Laurent
5,221,406 A    6/1993  Laurent
5,453,140 A    9/1995  Laurent et al.

FOREIGN PATENT DOCUMENTS

| EP | 0780 221 A2 | 6/1997 |
| GB | 1048241 | 11/1966 |
| GB | 2147561 A * | 5/1985 |
| WO | WO 91/04843 | 4/1991 |

* cited by examiner

Primary Examiner—Geoffrey L. Knable
(74) Attorney, Agent, or Firm—Finnegan, Henderson, Farabow, Garrett & Dunner, LLP

(57) ABSTRACT

A method of manufacturing components for a tire for vehicle wheels includes the steps of picking up a toroidal support using a robotized arm, feeding at least one elongated element from a delivery member disposed adjacent to the outer surface of the toroidal support, giving the toroidal support a rotatory motion around a geometric axis of rotation of the toroidal support so that the at least one elongated element is circumferentially distributed onto the toroidal support, and carrying out controlled relative displacements, for transverse distribution, between the toroidal support and the delivery member to form with the at least one elongated element a plurality of coils disposed mutually in side-by-side relationship in order to define a tire component. A method of manufacturing a tire, an apparatus for manufacturing components for a tire, a plant for making tires, and a tire including the manufactured components are also disclosed.

12 Claims, 4 Drawing Sheets

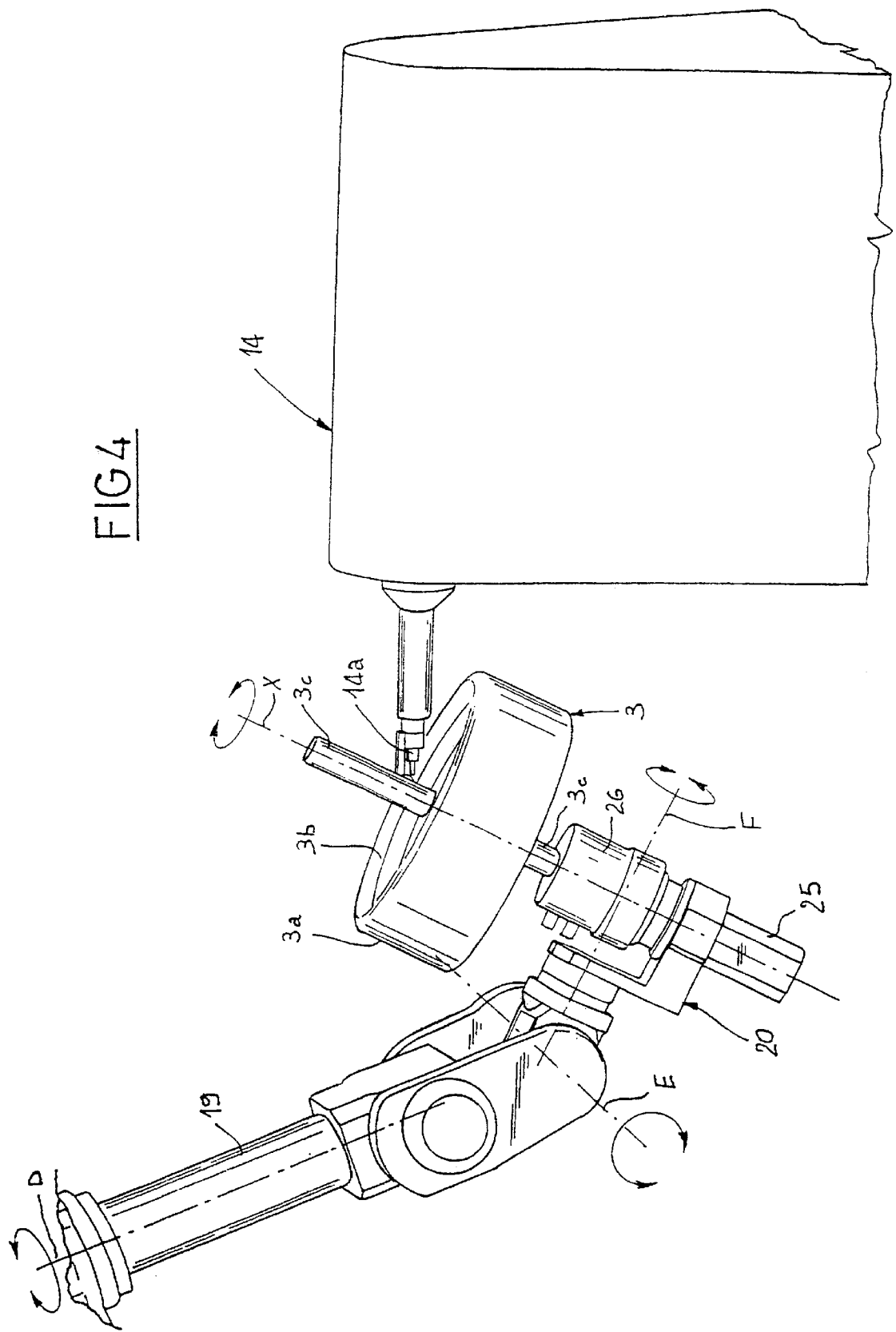

METHOD AND AN APPARATUS FOR MANUFACTURING COMPONENTS OF A TIRE FOR VEHICLE WHEELS

This application is a continuation of International Patent Application No. PCT/IT99/00377, filed Nov. 19, 1999, in the European Patent Office; additionally, Applicants claim the right of priority under 35 U.S.C. §119(a)–(d) based on patent application No. 98830762.5, filed Dec. 17, 1998, in the European Patent Office; further, Applicants claim the benefit under 35 U.S.C. §119(e) based on prior-filed, copending provisional application No. 60/118,529, filed Feb. 2, 1999, in the U.S. Patent and Trademark Office; the contents of all of which are relied upon and incorporated herein by reference.

The present invention relates to a method of manufacturing components for a tire for vehicle wheels, of the type comprising the steps of: a) feeding an elongated element from a delivery member disposed adjacent to an outer surface of a toroidal support; b) giving the toroidal support a rotatory motion for circumferential distribution around a geometric axis of rotation thereof, so that the elongated element is circumferentially distributed onto the toroidal support; c) carrying out controlled relative displacements between the toroidal support and the extrusion die so as to form with said elongated element, a plurality of coils disposed mutually in side by side relationship in order to define a tire component.

The invention also relates to an apparatus for manufacturing components for a tire being worked, of the type comprising: a toroidal support arranged for carrying the components of a tire being worked; feeding devices or other convenient feeder means for feeding at least one elongated element through a delivery member disposed adjacent to an outer surface of the toroidal support; circumferential-distribution devices or other convenient circumferential-distribution means arranged to drive the toroidal support in rotation around a geometric axis thereof, so that said elongated element is circumferentially distributed onto the toroidal support itself; transverse-distribution devices or other convenient transverse-distribution means arranged to give a relative movement between the toroidal support and said delivery member, for distributing said elongated element so as to form a plurality of coils disposed in side by side relationship in order to define a tire component.

DESCRIPTION OF THE RELATED

Manufacturing of tires for vehicle wheels involves formation of a carcass structure essentially consisting of one or more carcass plies having a substantially toroidal configuration and the axially opposite side edges of which are connected to respective circumferentially-inextensible annular reinforcing elements, usually named "bead cores".

Applied to the carcass structure, at a radially outer position thereof, is a belt structure comprising one or more belt strips in the form of a closed ring, essentially made up of textile or metallic cords suitably oriented in respect of each other and of the cords belonging to the adjacent carcass plies.

At a radially outer position relative to the belt structure, a tread band is then applied which usually consists of a strip of elastomer material of suitable thickness.

It is to point out that, to the purposes of the present description, by the term "elastomer material" it is intended the rubber blend in its entirety, that is the bled formed of at least one base polymer suitably amalgamated with reinforcing fillers and process additives of various types.

Ultimately, on the opposite sides of the tire being manufactured, a pair of sidewalls is applied, each of which covers one side portion of the tire included between a so-called shoulder region, located close to the corresponding side edge of the tread band, and a so-called bead located at the corresponding bead core.

Traditional production methods essentially provide that the above listed tire components should be first made separately of each other, to be then assembled in a tire-manufacturing step.

The Applicant's present trend is however that of resorting to production methodologies enabling production and stocking of semi-finished products to be minimized or, possibly, eliminated.

Practically, the Applicant's research and development are oriented towards new process solutions enable to manufacture the individual components applying them directly to the tire being manufactured according to a preestablished sequence.

On the other hand, from U.S. Pat. No. 5,453,140 it is known a method and an apparatus forming a carcass ply by laying down a plurality of parallel cords disposed circumferentially in side by side relationship onto a rigid toroidal support the shape of which matches that of the tire to be obtained, which cords are drawn from a continuous cord sequentially cut into lengths of appropriate size.

The Applicant too has developed manufacturing methods for forming a carcass structure, in which the carcass plies are obtained by laying down onto a rigid toroidal support, strip-like lengths obtained by sequentially cutting a continuous element made up of several cords incorporated into a layer of elastomer material.

Within the manufacturing scope of the carcass structure, as well as of other structural tire components such as sidewalls and tread band for example, manufacturing processes have been also proposed which aim at obtaining the desired component by laying down onto the tire being worked, a continuous strip-like element of elastomer material of a reduced section relative to that of the component to be obtained, and such arranged as to form a plurality of coils disposed consecutively in side by side and/or overlapped relationship around the rotation axis of the tire, so as to define the component itself in its final configuration.

In more detail, in U.S. Pat. Nos. 4,963,207 and 5,171,394 a method and an apparatus are respectively described in which given tire components are obtained by laying down a strip-like element of elastomer material onto a rigid toroidal support, which strip-like element is continuously fed from a delivery member associated with a volumetric extruder.

While the toroidal support is rotated around its own geometric axis, giving rise to a circumferential distribution of the strip-like element, the volumetric extruder is moved so as to impart controlled displacements to the delivery member in a meridian plane of the toroidal support, in order to distribute the different coils formed by the continuous strip-like element according to a predetermined pattern.

In U.S. Pat. No. 5,221,406 it is provided that a plurality of volumetric extruders should be arranged around the toroidal support, each of them being adapted to feed, through its own delivery member, a respective continuous strip-like element to be selectively employed for making a given tire component.

SUMMARY OF THE INVENTION

In accordance with the present invention, it has been found that if the controlled relative displacements between the toroidal support and delivery member are carried out by directly moving the toroidal support, instead of the extruder or any other apparatus associated with the delivery member itself, important advantages can be achieved in terms of simplification of the production plants, operation flexibility and productivity, as a result of a reduction in working dead times.

In more detail, it is an object of the present invention a method of manufacturing components for a tire for vehicle wheels, characterized in that said transverse-distribution displacements are performed by moving the toroidal support.

In more detail, both driving in rotation and movements of the toroidal support are preferably carried out by a robotized arm carrying the toroidal support itself.

Advantageously, the transverse-distribution displacements are carried out by moving the toroidal support according to at least five axes of oscillation, and more preferably according to at least six axes of oscillation.

It may be also advantageously provided that during the circumferential distribution of said at least one elongated element, the toroidal support should be moved keeping such an orientation that its geometric axis will be greatly inclined, preferably at an angle greater than 45°, relative to a horizontal plane.

It may be also provided that feeding of the elongated element should be carried out by extrusion through said delivery member, said elongated element being at least partly made of a raw elastomer material.

The toroidal support can be advantageously brought in front of said delivery member by said robotized arm, after removal of the toroidal support itself from a work station intended for executing a previous working step on the tire itself.

In accordance with the method in reference, the step of moving the toroidal support away from said delivery member by said robotized arm may be also provided, in order to transfer it either in front of at least another delivery member for formation of a further tire component or to a work station for carrying out a subsequent work step on the tire.

Said work station may be advantageously intended for formation of at least one carcass ply by sequential deposition of strip-like elements onto the toroidal support, the latter being supported and driven by the robotized arm, in a step-by-step movement around said geometric axis in synchronism with deposition of the individual strip-like elements, so as to give rise to a distribution of the strip-like elements according to a predetermined circumferential pitch.

It is also an object of the invention an apparatus for manufacturing components for a tire being worked, characterized in that said transverse-distribution devices or other convenient transverse-distribution means operate on said toroidal support for moving it with respect to the delivery member.

Advantageously, said circumferential-distribution means and said transverse-distribution means are integrated into a robotized arm.

More in particular, in a preferential embodiment the robotized arm comprises: a first section having a first end rotatably connected to a support platform according to first and second oscillation axes perpendicular to each other; a second section connected to a second end of the first section in an oscillating manner according to a third and a fourth oscillation axes perpendicular to each other; an end head arranged to engage rotatably and preferably in overhanging the toroidal support around the geometric rotation axis of the former, and connected to the second section in an oscillating manner at least according to a fifth axis of oscillation perpendicular to said fourth oscillation axis.

In more detail, said end head is in addition susceptible of oscillation around at least one sixth axis perpendicularly oriented with respect to the fifth oscillation axis.

At least one further work station is in addition preferably provided which is spaced apart from said feeder means and arranged to carry out a different work step on the tire, said robotized arm being arranged to transfer the toroidal support between said feeder means and work station.

Said further work station can be conveniently intended for making at least one carcass ply by sequential deposition of strip-like elements onto the toroidal support, said robotized arm being arranged to make the toroidal support rotate in a step-by-step movement around said geometric rotation axis, to cause a distribution of the strip-like elements according to a predetermined circumferential pitch.

BRIEF DESCRIPTION OF THE DRAWINGS

Further features and advantages will become more apparent from the detailed description of a preferred non-exclusive embodiment of a method and an apparatus for manufacturing components for tires for vehicle wheels in accordance with the present invention. This description will be taken hereinafter with reference to the accompanying drawings given by way of non-limiting example, in which:

FIG. 4 shows an end head of the robotized arm during the deposition of an elongated element in an area proximate to the bead opposite the one of FIG. 3.

DETAILED DESCRIPTION OF THE PREFERRED EMBODIMENTS

Figure 1:
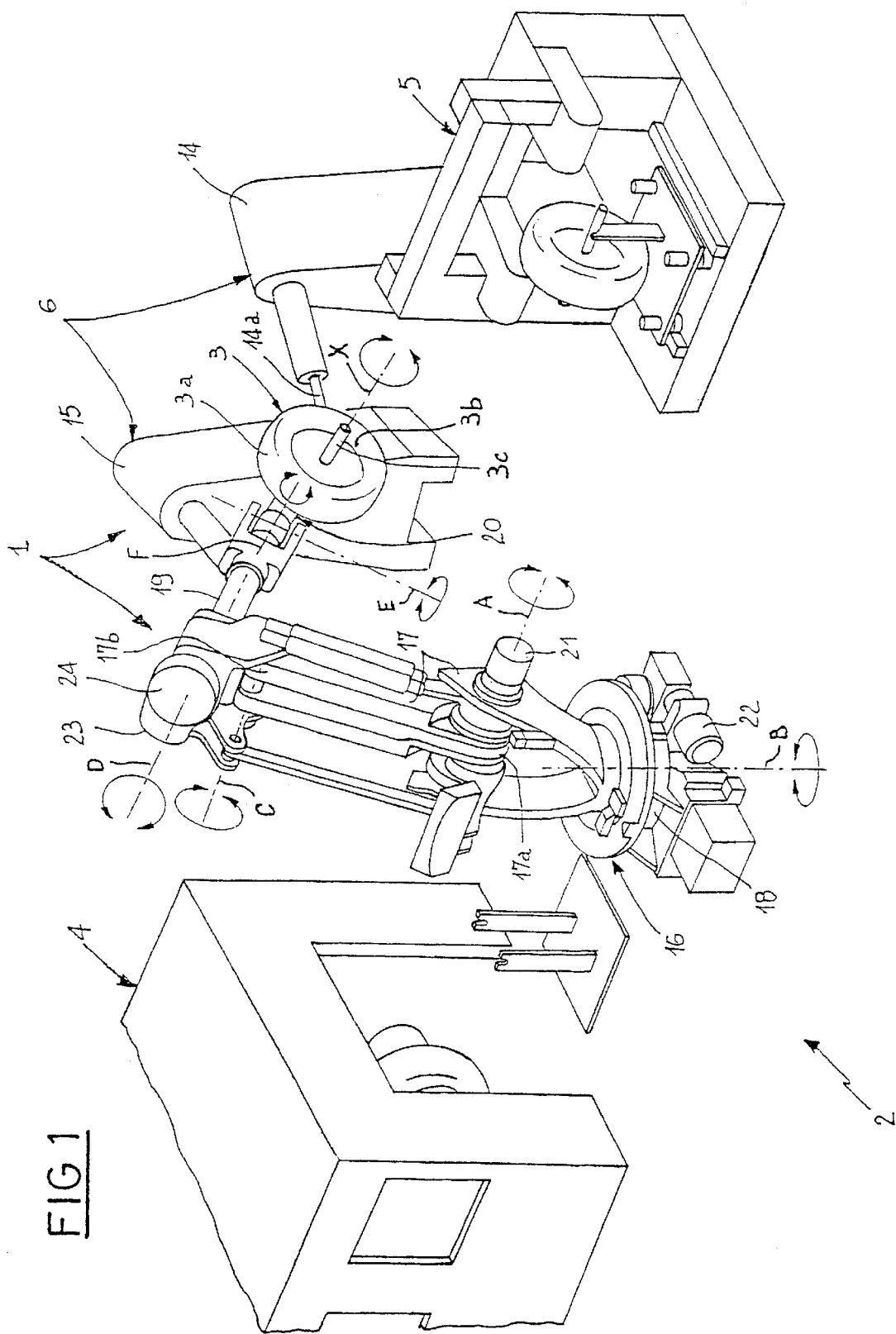
FIG. 1 is a diagrammatic perspective view of an apparatus in accordance with the invention, incorporated into a plant for manufacturing tires, only partly shown.

With reference to FIG. 1, an apparatus for manufacturing components for tires for vehicle wheels in accordance with the present invention has been generally identified by reference numeral 1.

Apparatus 1 is associated with a plant 2 intended for producing tires for vehicle wheels or executing part of the workings provided in the tire production cycle.

Within the scope of these workings, manufacture of different tire components is conveniently provided, which components are to be obtained directly on a rigid toroidal support 3 having an outer surface 3a, 3b the shape of which substantially matches the inner shape of the tire itself.

For the purpose, plant 2 generally comprises a plurality of work stations 4, 5, 6 each intended for carrying out at least one of said workings aiming at manufacturing the tire on the toroidal support 3.

Figure 2:
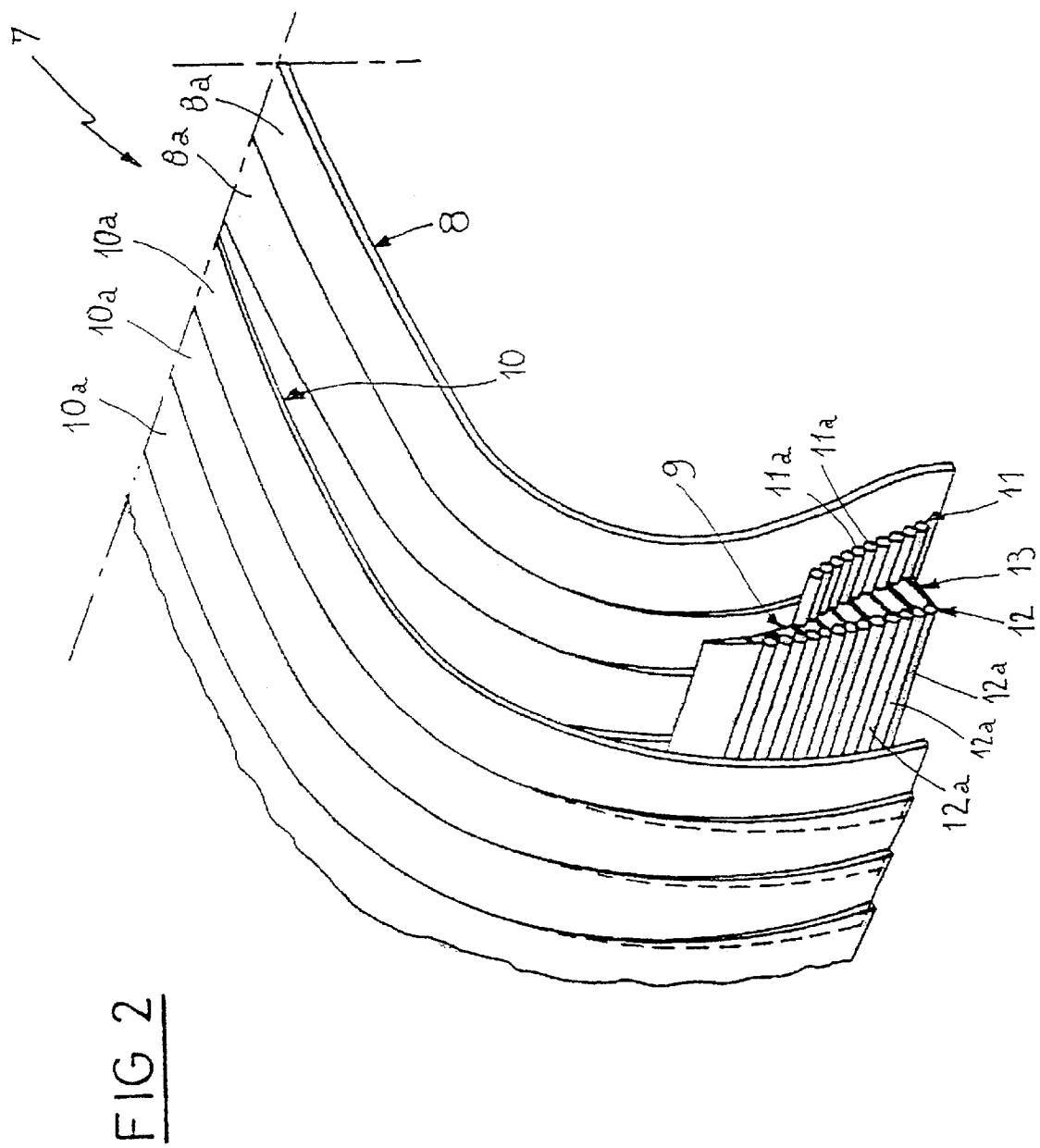
FIG. 2 is a perspective split view showing, by way of example only, a carcass structure of a tire obtainable by the method and apparatus in reference.

In more detail, in the example shown in FIG. 1 and described by way of example only, a portion of plant 2 is shown which is arranged to form a carcass structure generally identified by 7 in FIG. 2, on the outer surface 3a, 3b of the toroidal support 3. Carcass structure 7 essentially comprises at least one first carcass ply 8 such arranged as to cover the outer surface 3a, 3b of the toroidal support 3, at least one pair of annular reinforcing structures 9 disposed at respective end edges of the carcass ply 8 and an optional second carcass ply 10 placed in superposed relationship with the first carcass ply 8 and the annular reinforcing structures 9. Each annular reinforcing structure essentially comprises first and second circumferentially-inextensible annular inserts 11, 12 each comprising at least one metal wire wound in several coils 11a, 12a disposed in the form of a crown, and a filling body of elastomer material 13 axially interposed between the first and second annular inserts 11, 12.

The foregoing being stated, in the plant portion 2 intended for making the carcass structure 7 may be for example provided a first work station 4 for executing a step of pre-heating the toroidal support 3, and/or for the optional application of a so-called "liner" to the outer surface thereof, i.e. a thin rubber layer that, when vulcanization has been completed, will be airtight in order to ensure maintenance of the operating pressure in the tire.

A second work station 5 can be in turn intended for forming carcass plies 8, 10. Formation of each ply 8, 10 can be advantageously carried out by sequential deposition of strip-like elements 8a, 10a, disposed consecutively in side by side relationship in a mutually circumferential approach onto the outer surface 3a, 3b of the toroidal support 3. Further details as regards the manufacturing modalities of the carcass ply or plies 8, 10 in the second work station 5 are widely disclosed in European Patent Applications No. 97830731.2 and No. 97830733.8 in the name of the same Applicant.

Also provided is at least one third work station 6 arranged to form the annular reinforcing structures 9 at the inner end edges of the first carcass ply 8.

For the purpose, the third work station 6 comprises feeding devices or other convenient feeder means arranged to supply one or more elongated elements to be employed in making the filling body 13 and the inextensible annular inserts 11, 12.

In more detail the feeder means may for example comprise a first extruder 14 arranged to supply, through a respective delivery member 14a, at least one first continuous elongated element consisting of a strip of elastomer material of suitable size in cross section, to be employed for making the filling body 13 of each of the annular reinforcing structures 9.

More specifically, it is preferably provided for the cross section of the elastomer strip emerging from the delivery member 14a of the first extruder 14 to have a conveniently reduced section as compared with the transversal cross-section of the filling body 13 to be made.

The filling body 13 in its final configuration is obtained by delivery of the continuous elastomer strip onto the toroidal support 3 while said support, upon the action of circumferential-distribution devices or other convenient circumferential-distribution means, is driven in a rotatory circumferential-distribution motion around a geometric axis of rotation thereof denoted by "X".

Concurrently with the rotation imposed to the toroidal support 3, transverse-distribution devices or other convenient transverse-distribution means to be better described in the following will give rise to controlled relative displacements between the toroidal support itself and the delivery member 14a associated with the first extruder 14, in such a manner that the elastomer strip will form a series of coils disposed radially and/or axially in side by side relationship until they define the filling body 13.

The feeder means provided in the third work station 6 may further comprise at least one second extruder 15 arranged to supply, through a respective delivery member not shown in the drawings, a second continuous elongated element consisting, for example, of a rubberized metal wire for example, to be employed for making the annular inserts 11, 12 being part of each annular reinforcing structure 9. It is to note that the second extruder 15 can be replaced by a different feed unit, if for example a bare metal wire or a non-rubberized textile cord should be wished to be fed for the purpose of making each filling insert 11, 12.

Each inextensible annular insert 11, 12 is made by circumferentially laying down the respective rubberized metal wire onto the toroidal support 3, by virtue of the rotatory circumferential-distribution motion imparted to said support around a geometric axis thereof denoted by "X". Meanwhile, a transverse-distribution movement is also carried out between the toroidal support 3 and the delivery member of the second extruder 15, in such a manner that the continuous elongated element will form a series of coils 11a, 12a disposed consecutively in side by side relationship on moving away from or bring near to the rotation axis "X" of the toroidal support 3, so as to form the respective annular insert 11, 12.

In accordance with the present invention, both the circumferential-distribution movement, i.e. rotation of the toroidal support around its axis "X", and the transverse-distribution movement are accomplished by directly moving the toroidal support 3.

Under this circumstance, the extruders 14, 15 forming the means for feeding the elongated element can advantageously keep a fixed positioning during formation of the different components on the tire being worked.

For the purpose it is provided that the circumferential-distribution means intended for driving the toroidal support in rotation around its axis "X" and the transverse-movement means should be integrated into a robotized arm generally identified by 16, arranged to engage removably and preferably in overhanging the toroidal support 3 so as to sequentially bring it in front of each of the work stations 4, 5, 6 and conveniently move it relative to said stations.

In particular the robotized arm 16, preferably of the anthropomorphic type with seven axes, comprises a first section 17 having a first end 17a connected to a support platform 18 for rotation around a first horizontally-disposed oscillation axis "A", and around a second axis "B" disposed vertically or at all events perpendicular to the first oscillation axis "A".

The robotized arm 16 further comprises a second section 19 linked to a second end 17b of the first section 17, with possibility of oscillation about a third axis "C", preferably parallel to the first axis "A" and also around a fourth oscillation axis "D" perpendicular to the third axis "C" and preferably disposed longitudinally of the second section itself.

An end head 20 is operatively associated, at its end, with the second section 19 and is such arranged as to removably engage the toroidal support 3. Associated with the end head 20 is said circumferential-distribution means, consisting of a motor 25 for example, driving in rotation a grip element 26 intended to removably engage and preferably in overhanging the toroidal support 3 at an attachment shank 3c coaxially projecting from the opposite sides of said support.

In addition, the end head 20 is susceptible of oscillation around a fifth axis "E", perpendicular to the fourth oscillation axis "D".

In a preferential solution, the fifth axis "E" is coplanar with the fourth axis "D", and the end head 20 is in addition susceptible of oscillation under the action of a respective motor 27 (FIG. 3), around a sixth axis "F" perpendicularly oriented relative to the the toroidal support 3, and relative to the fifth axis of oscillation "E".

Movements of the first section 17, the second section 18 and the end head 20 around the respective oscillation axes "A", "B", "C", "D", "E", "F" are managed by respective motors, of which only the motors intended for movement around the first, second, third fourth and sixth axes are shown and identified by 21, 22, 23, 24, 27 respectively.

The motor not shown intended for movement around the fifth axis "E", like on the other hand the other motors too, can be however carried out in any manner convenient for a person skilled in the art.

Operation of all motors associated with the transverse-distribution means, as well as of the motor 25 associated with the circumferential-distribution means, is managed by an electronic control unit (not shown) in a manner adapted to ensure correct movement of the toroidal support 3 in the respective work stations 4, 5, 6, for the purpose of obtaining a correct formation of the tire components.

Employment of the transverse-distribution means directly operating on the toroidal support 3 offers the advantage of being able to use the same robotized arm 16 both for managing movement of the toroidal support 3 in front of the individual extruders 14, 15 and/or other feeder means provided in the first, second, third and other possible work stations, and for causing transfer of the toroidal support from a work station to another one.

In particular, in the example shown the robotized arm 16 picks up the toroidal support 3 from the first work station 4 in order to transfer it to the second work station 5 for the purpose of forming the first carcass ply 8.

During formation of the first carcass ply 8, the toroidal support 3 preferably stays in engagement with the robotized arm 16 that advantageously carries out suitable orientation of support relative to the devices for delivering and laying down the strip-like elements 8a provided in the second station itself, and drives it in rotation according to a step-by-step movement around the geometric axis "X", in synchronism with operation of the above mentioned delivery and deposition devices or other convenient delivery and deposition means, so as to cause distribution of the strip-like elements according to a predetermined circumferential pitch.

Subsequently, the toroidal support 3 is picked up from the second work station 5 to be brought in front of the first extruder 14 of the third work station 6, for the purpose of forming the first inextensible annular insert 11 of each annular reinforcing structure 9.

The toroidal support 3 is then brought in front of the second extruder 14 of the third work station 6, in order to give rise to formation of the filling body 13 of each annular reinforcing structure 9, to be then shifted again in front of the first extruder 14 for the purpose of enabling accomplishment of the second annular insert 12 and thus completing formation of the annular reinforcing structures 9.

Mobility of the toroidal support in the six oscillation axes "A", "B", "C", "D", "E", "F", in addition to driving in rotation of same around the geometric axis "X", enables a correct deposition of the elongated elements coming from extruders 14, 15 to be carried out, irrespective of the conformation of the toroidal support 3 and the tire components to be obtained.

When formation of the annular reinforcing structures 9 has been completed, the toroidal support 3 can be transferred again to the second work station 5 to enable formation of the second carcass ply 10 in the same manner as previously described in connection with the first carcass ply 8, thus completing manufacture of the tire carcass structure 7.

The same robotized arm 16, or one or more similar robotized arms installed in respective adjacent work areas provided in plant 2, can be designed for movement of the toroidal support 3 in front of further extruders or other feeding devices arranged to deliver the elongated elements provided for accomplishment of further tire components, such as sidewalls, tread band, belt layers for example, or the like, as well as for carrying out transfer of the toroidal support to other work stations designed for tire vulcanization, for example.

Therefore a complete working cycle of the tire can be made advantageously possible by forming all components thereof on the same toroidal support 3 which is sequentially transferred between the different work stations by one or more robotized arms 16, which arms also carry out handling of the toroidal support for the purpose of forming the individual components of the tire itself.

The present invention achieves important advantages.

Direct movement of the toroidal support represents an important improvement over the known art on the contrary providing movement of the extruders, above all in terms of simplification of the plants and reduction in the working dead times during the transferring steps from one station to another.

It is in fact to note that the toroidal support has an overall mass greatly lower than that of the extruders, movement of which is on the other hand made still more difficult due to the necessity to also move at least part of the apparatuses intended for feeding semifinished products to the extruders themselves.

In conclusion, movement of the toroidal support for achieving a correct transverse distribution of the elongated elements can be advantageously carried out in a quicker manner and with use of more limited spaces than those required in the known art.

Figure 3:
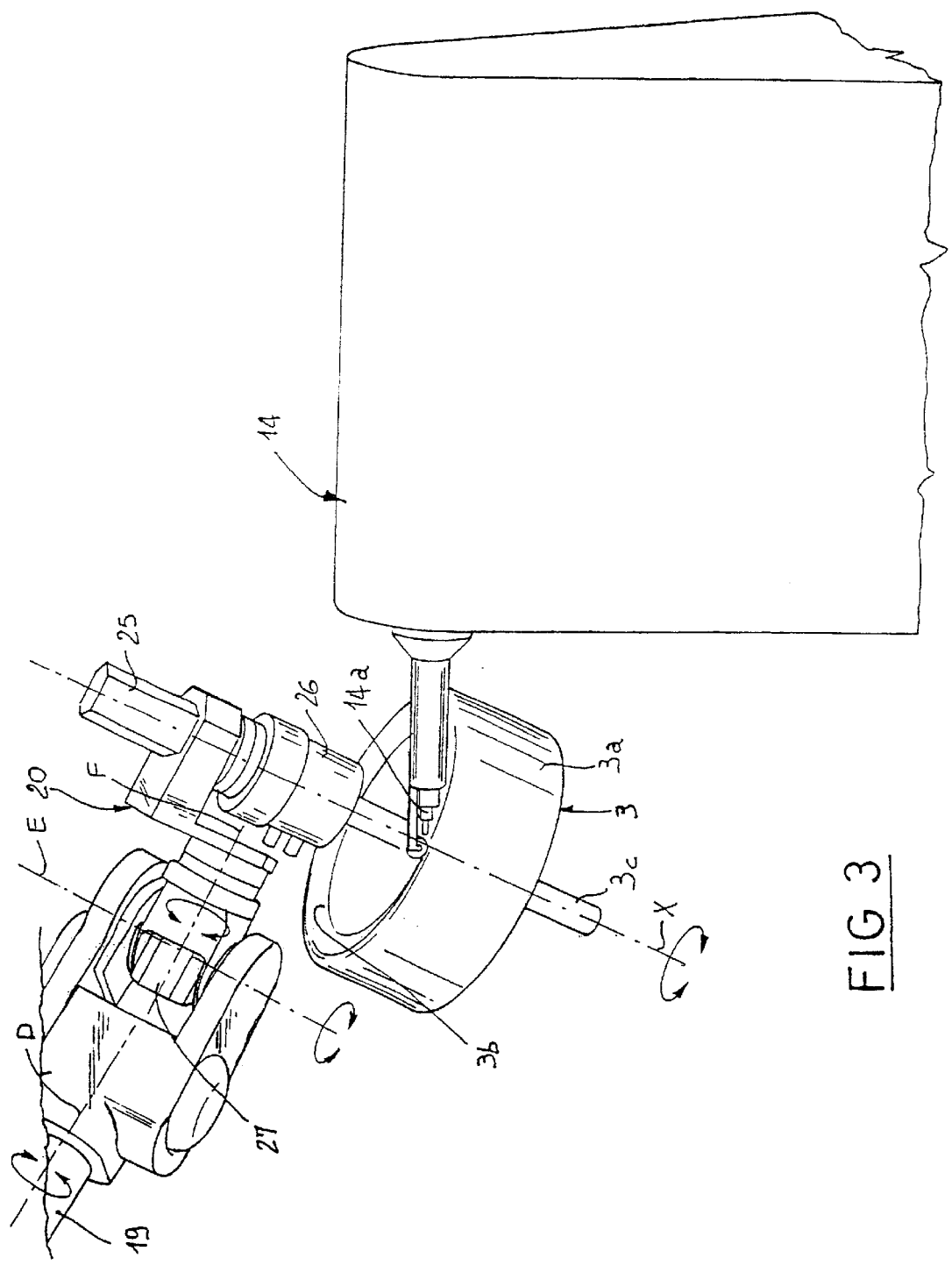
FIG. 3 shows, in enlarged scale relative to FIG. 1, the end head of the robotized arm during the application of an elongated element in an area proximate to one of the beads of the tire to be manufactured.

In this connection it is also to note that, as viewed from FIGS. 1, 3 and 4, the outer surface 3a, 3b of the toroidal support has a portion with a convex-profile bending 3a corresponding to the crown region of the tire, and two distinct portions with a concave-profile bending 3b at the regions corresponding to the tire sidewalls and proximate to the beads of the tire itself. Under this situation, known solutions currently require employment of at least three delivery members, three extruders for example, to manufacture components covering the whole outer surface of the toroidal support, due to the fact that freedom of movement of each delivery member (movable in three axes) is not sufficient to follow the whole cross-section profile of the toroidal support. Vice-versa, movements carried out in accordance with the present invention enable the toroidal support to advantageously take any position and orientation relative to the delivery members, thus making it possible to distribute one or more elongated elements over the whole extension of the outer surface of the toroidal support itself.

In accordance with the invention, it is also advantageously possible for the toroidal support to be disposed with its geometric axis of rotation oriented vertically or at all events greatly inclined to a horizontal plane, at an angle, just as an indication, greater than 45°, as shown in FIGS. 3 and 4. Thus deposition of the elongated elements is facilitated above all at the side and/or radially inner regions of the outer surface of the toroidal support, where a convex bending and the effects of the force of gravity make it difficult to correctly carry out deposition, keeping the toroidal support oriented in a substantially horizontal axis of rotation.

From a comparison between FIGS. 3 and 4, it is readily apparent that the ample mobility of the toroidal support 3 in space, attained through the use of the robotized arm, allows to distribute uniformly over the entire outer surface 3a, 3b of the toroidal support itself the elongated element arriving from the delivery member 14a. In particular, it is made possible to apply the elongated element also in proximity to the radially interior areas 3b of the toroidal support, that is to say in the areas proximate to the beads of the tire, where the outer surface assumes a concave profile, which would be difficult or impossible to reach if the application were performed according to the prior art.

The freedom of motion of the toroidal support 3 also allows easily to control the thickness of the elastomeric material component formed on the toroidal support 3. Using as an elongated element a continuous ribbon with flattened section, it is possible to modify the orientation of the outer surface 3a, 3b of the toroidal support 3 relative thereto in order to vary the thickness of the component which is formed between a minimum value, obtained when the strip-like element is deposed substantially "flatly", i.e. with the greater axis of its cross section oriented parallel to the outer surface 3a, 3b, and a maximum value, obtainable when the greater axis of the cross section of the strip-like element is substantially normal to the outer surface 3a, 3b. Thicknesses exceeding the maximum value specified above can also be obtained by forming multiple coils, one superimposed on the other, in a direction substantially normal to the outer surface of the toroidal support.

It is also to point out that the transverse distribution of the elongated element carried out in accordance with that which is suggested by the invention enables the same robotized arm to be utilised for obtaining both movement of the toroidal support for the purpose of achieving a transverse distribution, and transfer of the toroidal support itself between the different work stations.

This situation too represents an important advantage over the known art, where the presence of handlers or transfer lines is in any case required in addition to the means intended for movement of the extruder, in order to cause transfer of the toroidal support from one work station to the subsequent one.

It is further to note that also solutions based on employment of different extruders simultaneously operating on the toroidal support as provided in U.S. Pat. No. 5,221,406 have many limits, in that the available space for installation of the extruders and movement of same is greatly correlated with the space physically available around the outer surface of the toroidal support.

The present invention enables also these limits to be overcome, due to the possibility of carrying out transfer of the toroidal support by the same robotized arm as used for moving the toroidal support itself in front of the individual extruders, with wide operation spaces.

What is claimed is:

1. A method of manufacturing components for a tire for vehicle wheels, comprising the steps of:
   picking up a toroidal support using a robotized arm, the toroidal support having an outer surface substantially matching an inner shape of the tire;
   feeding at least one elongated element from a delivery member disposed adjacent to the outer surface of the toroidal support;
   giving the toroidal support a rotatory motion around a geometric axis of rotation of the toroidal support so that the at least one elongated element is circumferentially distributed onto the toroidal support; and
   carrying out controlled relative displacements, for transverse distribution, between the toroidal support and the delivery member, to form with the at least one elongated element a plurality of coils disposed mutually in side-by-side relationship in order to define a tire component,
   wherein the rotatory motion and the transverse distribution displacements are performed by moving the toroidal support using the robotized arm.

2. The method of claim 1, wherein the transverse distribution displacements are carried out by moving the toroidal support according to at least five axes of oscillation.

3. The method of claim 1, wherein the transverse distribution displacements are carried out by moving the toroidal support according to at least six axes of oscillation.

4. The method of claim 1, wherein during circumferential distribution of the at least one elongated element, the geometric axis of rotation of the toroidal support is inclined relative to a horizontal plane.

5. The method of claim 1, wherein feeding of the at least one elongated element is carried out by extrusion through the delivery member, and wherein the at least one elongated element comprises a raw elastomer material.

6. The method of claim 1, further comprising the step of moving the toroidal support away from the delivery member using the robotized arm in order to position the toroidal support in front of at least one additional delivery member for formation of a further tire component.

7. The method of claim 1, wherein the toroidal support is positioned in front of the delivery member using the robotized arm after removal of the toroidal support from a work station intended for carrying out a previous working step on the tire.

8. The method of claim 7, wherein the work station is intended for formation of at least one carcass ply by sequential deposition of strip elements onto the toroidal support, and wherein the toroidal support is supported and driven by the robotized arm in a step-by-step movement around the geometric axis of rotation of the toroidal support, in synchronization with the deposition of the strip elements, to distribute the strip elements according to a predetermined circumferential pitch.

9. The method of claim 1, further comprising the step of moving the toroidal support away from the delivery member using the robotized arm to transfer the toroidal support to a work station in order to carry out a subsequent working step on the tire.

10. The method of claim 9, wherein the work station is intended for formation of at least one carcass ply by sequential deposition of strip elements onto the toroidal support, and wherein the toroidal support is supported and driven by the robotized arm in a step-by-step movement around the geometric axis of rotation of the toroidal support, in synchronization with the deposition of the strip elements, to distribute the strip elements according to a predetermined circumferential pitch.

11. A method of manufacturing a tire for vehicle wheels, wherein at least one component of the tire is manufactured by the method of claim 1.

12. The method of claim 1, wherein the toroidal support is supported in overhanging by said robotized arm.

* * * * *